Oct. 22, 1935.   J. G. HARTLEY   2,018,258
METHOD OF BUILDING UP BATTERED RAIL ENDS
Filed May 17, 1934   3 Sheets-Sheet 1
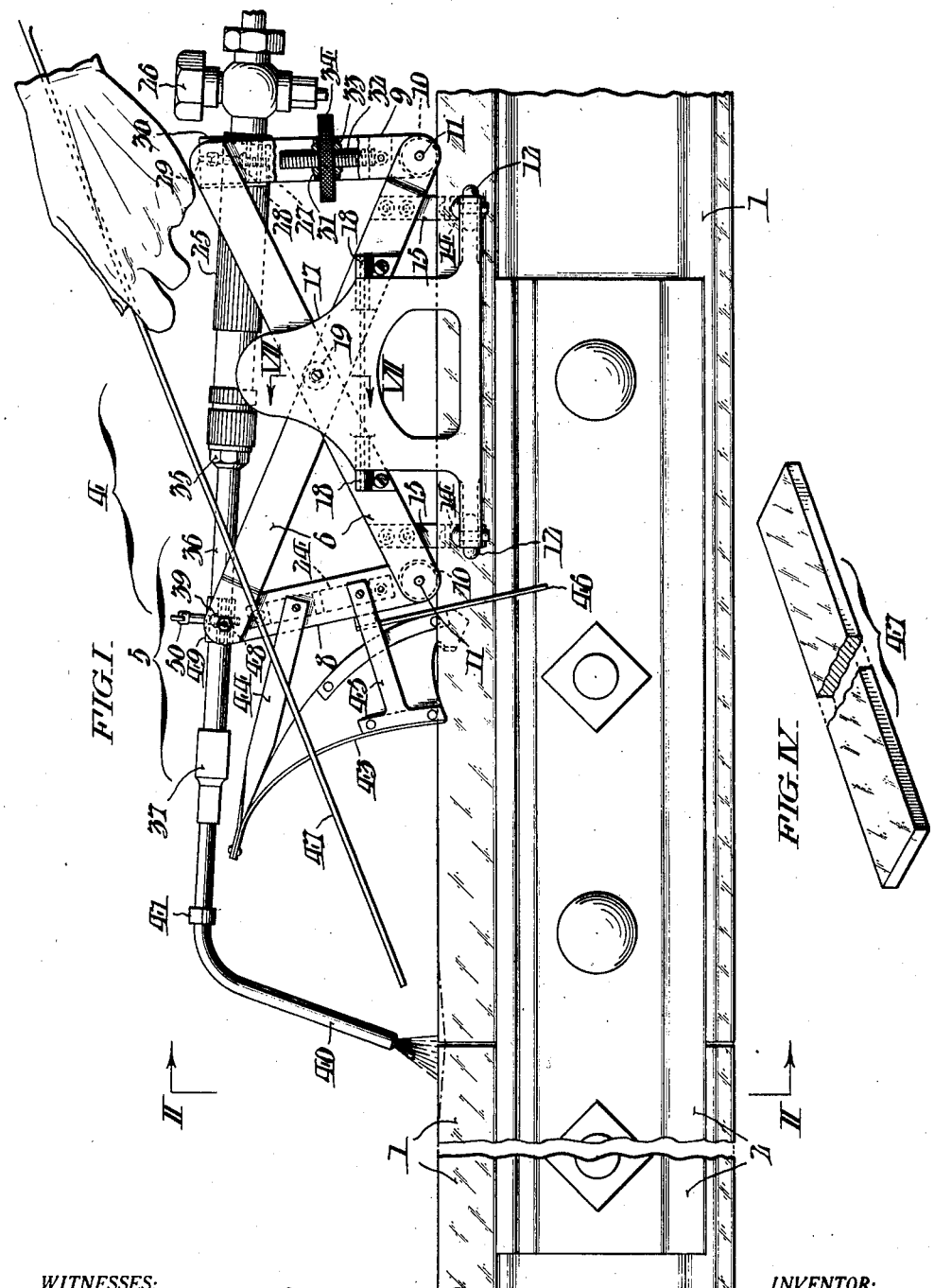
WITNESSES:
INVENTOR:
John G. Hartley
BY
ATTORNEYS.

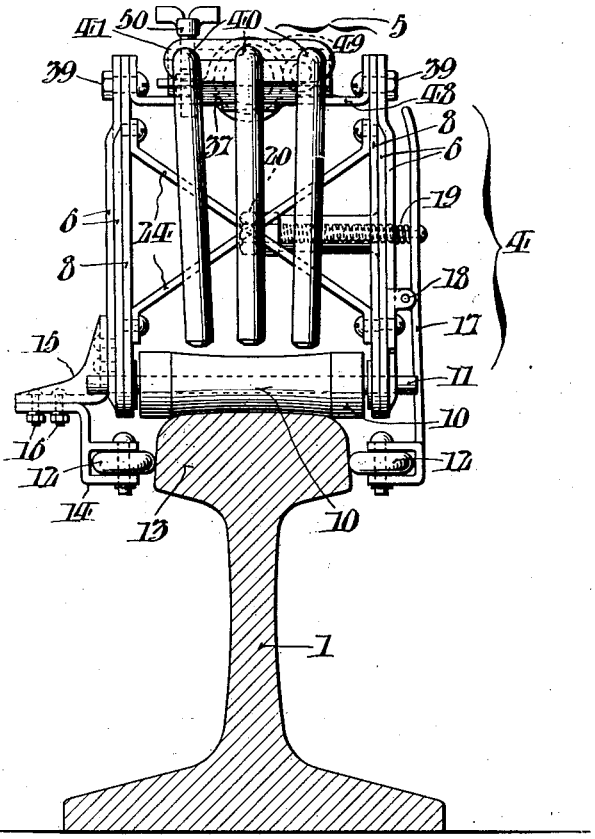
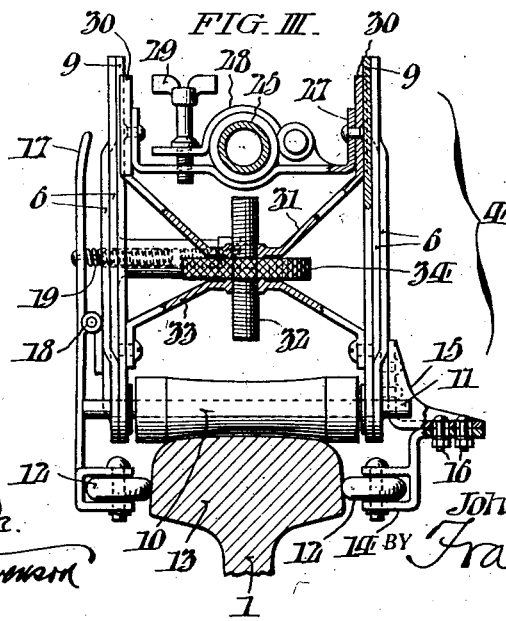

Oct. 22, 1935.    J. G. HARTLEY    2,018,258
METHOD OF BUILDING UP BATTERED RAIL ENDS
Filed May 17, 1934    3 Sheets-Sheet 3
FIG. V.
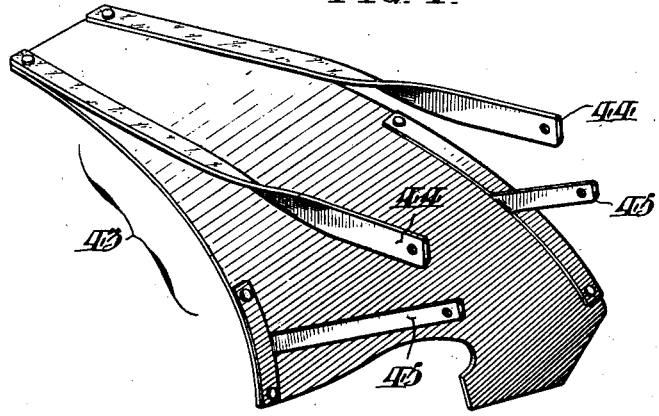
FIG. VI.
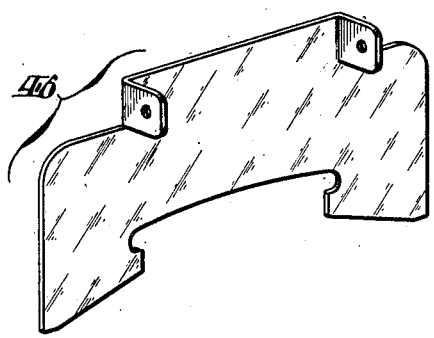
FIG. VII.
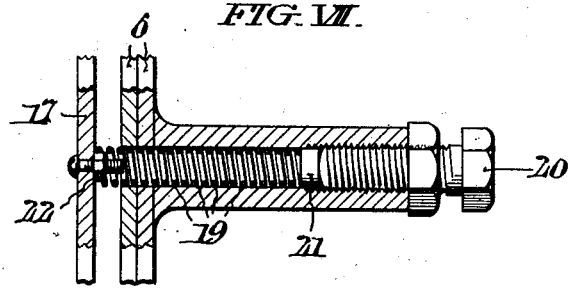
WITNESSES:    INVENTOR:
    John G. Hartley,
    BY
    ATTORNEYS.

Patented Oct. 22, 1935

2,018,258

UNITED STATES PATENT OFFICE 2,018,258

METHOD OF BUILDING UP BATTERED RAIL ENDS

John G. Hartley, Wayne, Pa.

Application May 17, 1934, Serial No. 726,189

5 Claims. (Cl. 29—169)

This invention relates to a method of building up battered rail head surfaces, particularly rail ends, by welding additional metal to such surfaces to restore them to their original condition.

Heretofore, for building up rail ends at track joints it has been common practice to use a single flame oxy-acetylene welding torch in conjunction with a round welding rod. The operator customarily preheats the rail at the battered area which is to be built up, then applies the torch to a particular portion of such area to bring the surface at that portion to a welding heat, and then inserts the welding rod into the flame, causing the metal of the rod to flow onto the prepared surface and to mix with the surface metal so as to become an integral part thereof. Inasmuch as the heating effect of a welding torch provided with a single tip is necessarily confined to the surface area of the rail exposed to the flame, it requires the repeated application of the flame to one portion of the rail surface and then another to obtain a deposit from the welding rod of sufficient metal to cover the entire width of the rail head. With successive applications of the welding flame to relatively small adjoining portions of the rail surface, the heat is driven further and further into the rail head until finally it penetrates the rail web. There being less metal in the web of the rail than the head, unequal stresses are set up while the structure is cooling, due to the inequalities in the cross sectional areas of the rail head and rail web, with the result that minute checks or flaws develop in the rail fibre, incident to the action of passing wheel loads; and such checks or flaws often spread and develop into cracks which may cause the rail to break under traffic.

Moreover, the time required to build up a battered rail end according to the methods customarily used is unduly long, and it is difficult to obtain a homogeneous and even surface.

Accordingly, the object of the present invention is to provide an improved method of building up rail heads which avoids the above described difficulties. The method of this invention permits the operation to be performed in a relatively short time, with avoidance of heat penetration into the rail web, and with avoidance of cold spots on the rail surface, thus producing a more even surface and a more perfect fusion of the welding rod metal with the parent metal of the rail.

Other more specific objects and advantages characteristic of this invention will become apparent from the description hereinafter set forth of one example of the practice of the invention, having reference to the accompanying drawings. Of the drawings:

Fig. I represents a side elevation of a rail joint and a convenient form of apparatus which may be employed for carrying out the method of this invention.

Fig. II represents a front elevation of the same, as viewed from the left-hand end of Fig. I and indicated by the arrows II—II.

Fig. III represents a rear elevation of the same, viewed from the right-hand end of Fig. I.

Fig. IV represents a perspective view of a special form of welding rod used for this invention.

Fig. V represents a perspective view of the shield of the above apparatus which is used for the protection of the operator.

Fig. VI represents a perspective view of the extension member associated with said shield; and, Fig. VII represents an enlarged cross section of the carriage, taken as indicated by the lines VII—VII of Fig. I.

In the drawings there is illustrated a rail joint comprising rail ends 1, joined together by a joint bar 2 in a conventional manner. Mounted on one of the rails there is shown a roller carriage 4 carrying a welding torch, comprehensively designated at 5. The special form of torch and the supporting and guiding carriage shown in the drawings and hereinafter described represent merely a convenient apparatus useful for the practice of this invention, and it is to be understood that my invention is not limited to such apparatus, for it may be carried out with many other forms of equipment. The particular carriage 4 shown in the drawings comprises a framework of diagonal side bars 6, front bars 8, and rear bars 9. At the front and rear end of the framework along the bottom thereof, rollers 10 are provided for engagement with the tread surfaces of the rail, these rollers being supported by pins 11 disposed at the points of intersection of the side bars 6 with the bottom ends of the front bars 8 and rear bars 9. Preferably the rollers 10 are centrally concaved to conform substantially with the arcuate contour of the tread surface of the rail.

Additional rollers 12 are supported on the carriage 4 in such manner as to bear against the sides of the rail head 13. The rollers 12 at one side of the rail are mounted on stirrups 14 which are in turn adjustably secured to angle brackets 15 by means of bolts 16. At the other side of the rail the rollers 12 are mounted on a plate 17 which is pivoted to the side bars 6 by hinges 18. Preferably at the point of intersection of the side bars 6, a spring 19 is provided for the purpose of urging the upper end of the hinged plate 17 outwardly, and hence urging the rollers 12 carried at the lower end inwardly toward the side of the rail head 13. For the purpose of adjusting the tension on the spring 19, I desirably employ an adjusting screw 20 which operates on the inner end of the spring 19, as shown most clearly in Fig. VII. The adjusting screw 20 is externally threaded and bears against a plug 21 which in turn bears against the inner end of the spring 19. The outer end of the spring 19 is restrained against shifting by means of a nut 22. The adjustment of the tension on the spring 19 is obtained by turning the adjusting screw 20 in one direction or the other. It is desirable that the spring 19 be under sufficient tension to urge the hinged plate 17 with its rollers 12 against the rail with such pressure as to maintain the carriage 4 against lateral shifting. Moreover, it will be observed that by means of the adjustable stirrups 14 at the opposite sides of the rail, it is possible to adapt the carriage for use on rails of different sizes and to insure centering of the carriage with respect to the longitudinal center line of the rail. The forward end of the carriage is braced by crossing bars 24, shown clearly in Figs. I and II, which serve to rigidify the framework.

The torch 5 is shown pivotally mounted on the front of the carriage 4 with its discharge end extending forwardly and downwardly toward the rail. The rear end of the torch 5 is in the form of a barrel 25 equipped with a connection 26 including valves controlling the supply of gas and oxygen from flexible hoses which are not shown in the drawings.

To maintain the barrel 25 in a fixed position within the carriage 4, and hence to maintain the discharge end of the torch at a fixed vertical distance above the rail, I preferably employ at the rear of the carriage 4 a holder 27 having a hinged clip 28 for engaging the barrel 25 and a wing screw 29 for fastening the clip to the barrel. The barrel holder 27 has at each side thereof channel pieces 30 mounted for sliding vertical movement on the bars 9. Moreover, the holder 27 includes a depending bracket 31 having threaded engagement with a double ended screw 32. The lower portion of the screw 32 engages the fixed bracket 33, and the screw is operated by means of a knurled disc 34. By turning the disc 34 in one direction or another, the barrel 25 may be elevated or depressed in an obvious manner.

On the front end of the barrel 25 there is provided a holding nut 35 from which there extends forwardly a pipe section 36 which terminates in an enlarged distributing chamber 37. From the distributing chamber 37 a plurality of discharge tips 40 (there being three such tips shown in the example selected for illustration) extend forwardly and downwardly to a position above the rails 1. The discharge tips 40 are preferably joined together by spacing means in the form of a block or the like, as indicated at 41, and they are arranged in a plane transverse to the longitudinal axis of the rails 1.

For supporting the torch 5 upon the carriage 4 the pipe section 36 is carried within a holder 48 having a hinged clip 49 which surrounds the pipe section and which is secured in place by a wing nut 50. The holder 48 is pivotally attached to the front end of the carriage 4 by bolts 39.

As clearly seen in Fig. II, the discharge tips converge downwardly with their axes corresponding to radial lines drawn from a common center coincident with the center line of the rail, thus producing the most effective heating action upon the rail surface. Moreover, the extreme ends of the discharge tips are disposed along an arc corresponding in contour to the surface contour of the rail, thus producing a uniform heating effect as to each tip. The spacing of the discharge tips 40 is so arranged that the flame of each tip overlaps the flame of the adjacent tip at a point sufficiently above the tread surface of the rail to provide the maximum heat, and a sufficient number of tips is provided so that they collectively cover the width of the tread surface.

For the purpose of guarding the operator against injury, there is preferably provided a curved shield 43 disposed in advance of the carriage 4 and secured thereto by means of supports 44, 45. The shape of the shield 43 is most clearly illustrated in Fig. V. The shield 43 is supplemented by a downward extension member 46 which is illustrated in perspective in Fig. VI and which guards the legs of the operator.

In carrying out the method of this invention, in lieu of the customary round or oval shaped welding rod, the operator employs a welding rod in the form of a flat ribbon 47 as shown most clearly in Figs. I and IV. In its preferred form the welding rod 47 is of uniform thickness throughout and of a sufficient width to cover substantially the width of the tread surface of the rail incident to its deposition thereon. For example, I have found that for use on one hundred pound rails, having a width of head of approximately two-and-one-half inches, a welding rod having a width of approximately one-and-one-quarter inches, and a thickness of approximately one-eighth of an inch, satisfactorily covers the tread surface when applied in the manner hereinafter described.

In building up a battered rail end, the operator after adjusting the carriage 4 and torch 5 to obtain the best results in accordance with previous experience, and having clamped the torch in a fixed position centered with respect to the rails, proceeds to apply a welding heat to the entire width of the battered rail head surface shown in dot-and-dash lines in Fig. I. When the rail reaches the desired temperature with uniform heating from one side thereof to the other, the operator proceeds to insert the flat welding rod 47 within the flame and to deposit the welding material uniformly and evenly from side to side. After applying the layer of metal from the welding rod 47 extending from side to side of the rail, the operator proceeds to move the torch carriage 4 to a new position along the length of the rail and repeats the operation, thus continuing until the battered surface has been built up to a normal condition. The welding rod 47 is preferably held at an angle to the rail approximating that shown in the drawings. As the rod 47 is of even thickness throughout, it makes possible the quick and even deposition of the welding material onto the rail head surface, causing a uniform deposit which extends from side to side of the rail head and which requires very little finishing with grinding tools or the like to obtain a smooth surface.

It will be apparent that the use of a multiple flame torch of the character described, in conjunction with a ribbon form welding rod, enables the building up of a battered rail end to be accomplished with a single heat application for each increment of the length of the rail surface and thus permits the entire operation to be performed in a relatively short space of time. Furthermore, heat penetration of the rail head is reduced to a minimum and is confined to the portion near the surface, avoiding the possibility of damaging the rail fiber, and particularly avoiding checks or flaws in the neighborhood of the rail web such as are ordinarily caused by the use of successive or repeated heat applications confined to a small portion of the rail head.

While I have described my invention with reference to a particular form of apparatus especially convenient for carrying out the improved method of building up rail ends, it will be apparent that this invention contemplates the use of other equipment than that described, and that the various steps employed may be varied considerably without departing from the spirit of the invention as defined in the annexed claims.

Having thus described my invention, I claim:

1. A method of building up battered rail ends which consists in uniformly heating in one simultaneous operation the surface of the rail head to be built up, throughout the width thereof, and depositing at the same time welding material over said surface from a ribbon form welding rod of uniform thickness held above the rail and moved therealong, thereby confining heat penetration in the rail head to near the surface thereof.

2. A method of building up battered rail ends which consists in uniformly and simultaneously heating the surface of the rail head to be built up by means of a multiple flame torch applied to the rail head throughout the width thereof, and depositing welding material over said surface from a ribbon form welding rod of uniform thickness held above the rail and moved therealong.

3. A method of building up battered rail ends which consists in uniformly heating the surface of the rail head to be built up, throughout the width thereof, and depositing from above the rail welding material over said surface from a ribbon form welding rod having a uniform thickness and having a sufficient width to cover substantially the width of the tread surface of the rail incident to its deposition thereon.

4. A method of building up battered rail ends which consists in heating the surface of the rail head to be built up by means of a torch having a plurality of tips disposed transversely to the rail with their flames applied between the confines of the rail head surface and distributed in overlapping relation thereover, and depositing from above the rail welding material substantially over the width of the tread surface of the rail.

5. A method of building up battered rail ends which consists in uniformly heating in one operation the surface of the rail head to be built up, throughout the width thereof, and at the same time feeding and depositing welding material over said entire heated surface, thereby confining heat penetration in the rail head to near the surface thereof.

JOHN G. HARTLEY.